United States Patent [19]

Steensma et al.

[11] 4,450,554
[45] May 22, 1984

[54] ASYNCHRONOUS INTEGRATED VOICE AND DATA COMMUNICATION SYSTEM

[75] Inventors: Peter D. Steensma, Midland Park; Murray Weinberg, Union; Robert W. Smid, Wykoff; Thomas E. Finley, Pompton Lakes, all of N.J.

[73] Assignee: International Telephone and Telegraph Corporation, New York, N.Y.

[21] Appl. No.: 291,690

[22] Filed: Aug. 10, 1981

[51] Int. Cl.$^3$ .............................................. H04J 3/16
[52] U.S. Cl. ........................................ 370/4; 370/80; 370/94
[58] Field of Search .................... 370/1, 2, 3, 4, 41, 370/42, 60, 86, 91, 94, 80

[56] References Cited

U.S. PATENT DOCUMENTS 3,803,405  4/1974  Ohnsorje et al. ...................... 370/4
4,316,283  2/1982  Ulug ...................................... 370/94

OTHER PUBLICATIONS

"Integrated Broad-Band Communication Using Optical Networks-Results of an Experimental Study", H. J. Matt et al., *IEEE Transactions on Communications*, vol. COM-29, No. 6, Jun. 1981, pp. 868-885.

*Primary Examiner*—Gerald L. Briganee
*Attorney, Agent, or Firm*—John T. O'Halloran; Alfred C. Hill

[57] ABSTRACT

The asynchronous integrated voice and data communication system includes a continuously variable slope delta encoder and a continuously variable slope delta decoder to convert voice signals to coded signals and vice versa. A packetizer and a depacketizer are employed with each data and voice user to enable each of the plurality of data and voice users to have random access to a fiber optic transmission medium enabling each of the plurality of data and voice users to receive transmissions from all others of the plurality of users. A microcomputer is coupled to each of the voice and data users and the associated packetizer and depacketizer to enable any one of the plurality of data and voice users to establish communication with any other selected one of the plurality of data and voice users.

33 Claims, 11 Drawing Figures

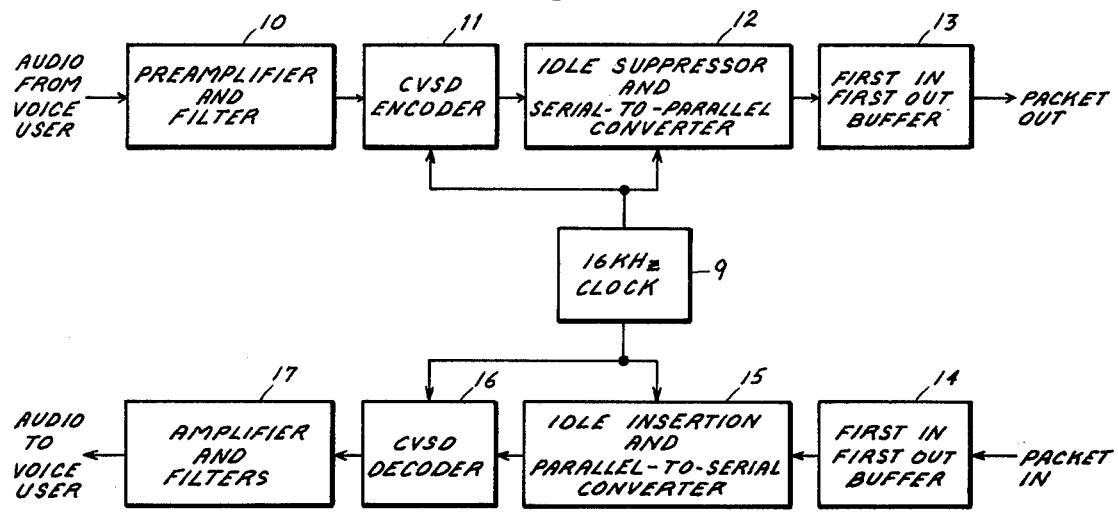
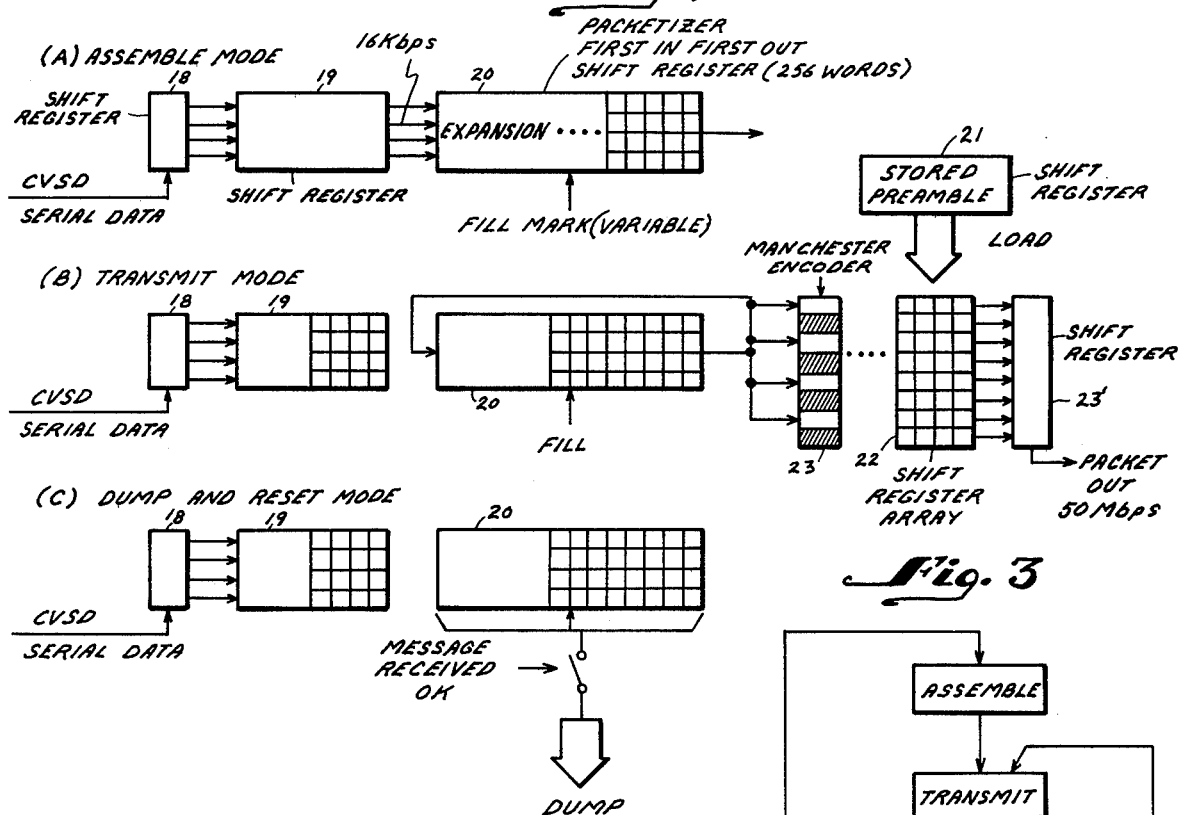
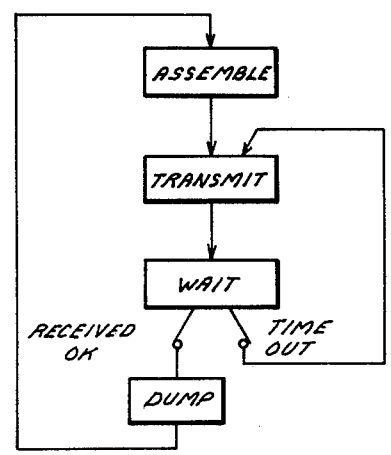

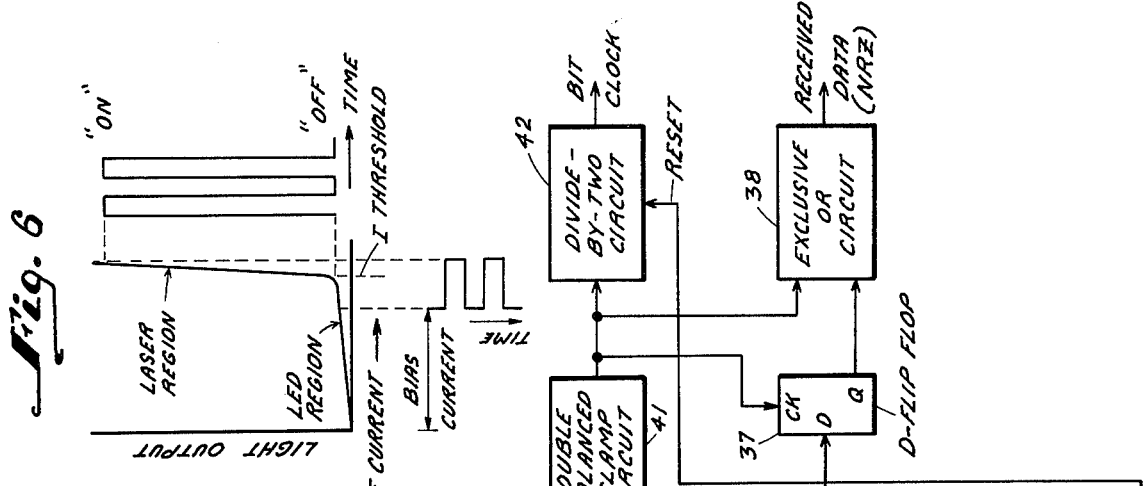
Fig. 6
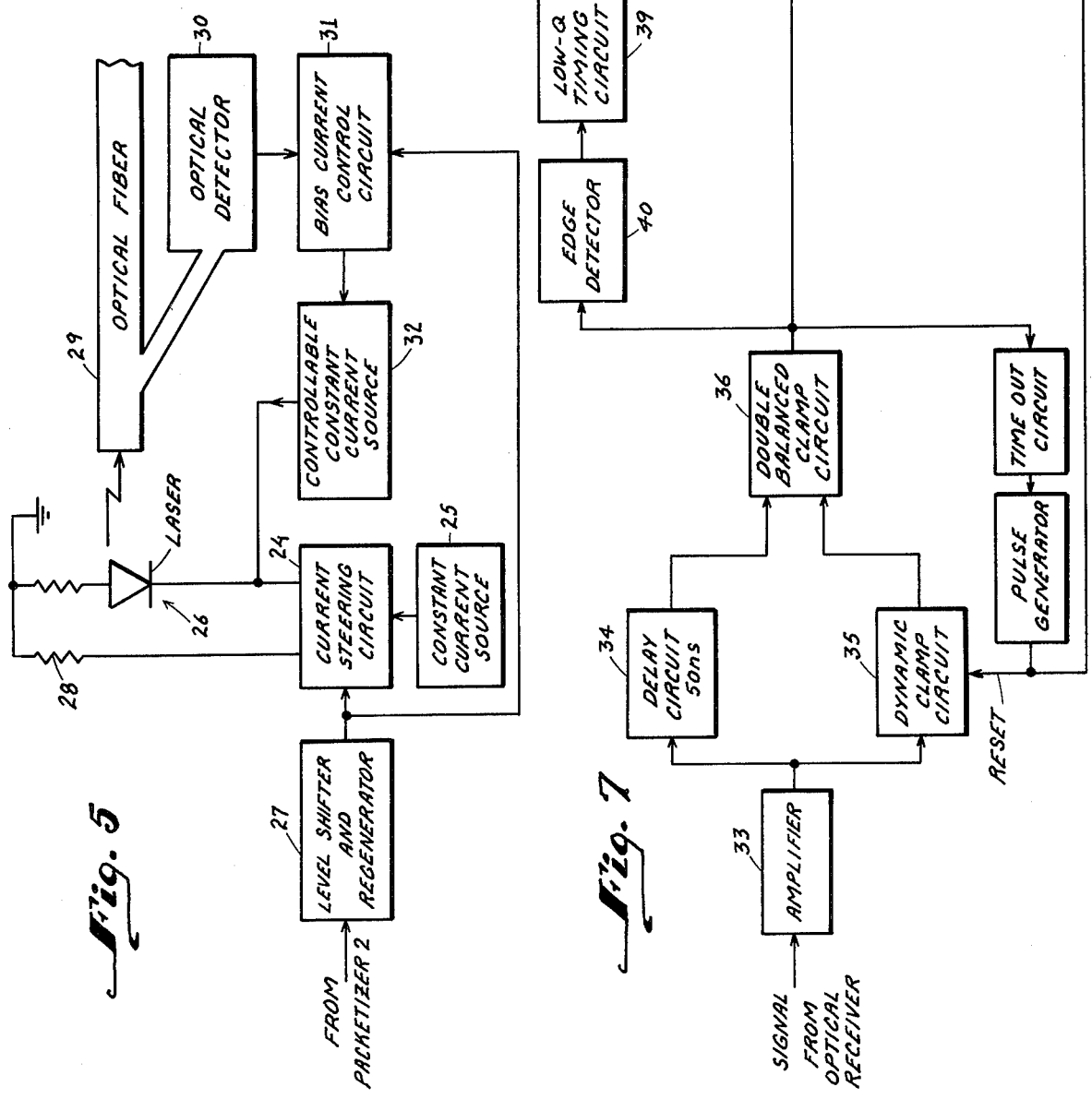
Fig. 5
Fig. 7

ASYNCHRONOUS INTEGRATED VOICE AND DATA COMMUNICATION SYSTEM

BACKGROUND OF THE INVENTION

The present invention relates to communication systems and more particularly to an asynchronous integrated voice and data communication system.

To date data buses or communication systems have employed either time division multiple access in which each channel that wants to use the transmission medium or bus is preassigned a time slot in which to place his message, or frequency division multiple access in which each channel is assigned a frequency slot. Such assignments can be made at the time the network is established or on a dynamic basis by a network controller to whom all users listen. A user's position in the time or frequency space of the system determines his identity.

Many forms of traffic operate on a demand cycle basis that have different structures. Telephone users are rather infrequent users (at lower levels in the hierarchy) but have extended contact times of minutes. Computers and other data sources are frequent users but have short durations of contact. Consequently, any rigid structure of bus or transmission medium time or frequency assignment will discriminate against one type of user or the other. Unfortunately, as communications grow, both types of traffic will be commonly present. The challenge is to handle both types of traffic in a transparent manner on a common channel.

Generally rigid assignment structures have been conceived and used to conserve bandwidth. However, with the utilization of fiber optic transmission technology, it can be confidently projected that in wired systems, bandwidth will significantly decrease in cost. Furthermore, with the advent of inexpensive low and medium powered computation, new transmission medium or bus operation structures become thinkable and economically attractive.

One of the central technical questions in developing an integrated data and voice transmission system has been the development of communications architectures to economically and efficiently handle data communications. The classical switching approaches to handle these communications requirements (circuit switching, message switching and packet switching) try to meet these needs while conserving transmission capacity requirements and minimizing terminal intelligence. Since these were the most expensive items in the system cost, this was really an attempt to minimize the cost per line of serving the users.

Delay and set-up times determine the applicability of these different switching approaches to different users. Voice users demand minimum delay in message delivery but can tolerate rather long set-up times. For data users the situation is reversed, since message and packet switched networks introduce delay to gain trunk use efficiency. However, commonality of voice and data service is relinquished in the process.

SUMMARY OF THE INVENTION

An object of the present invention is to provide an integrated data and voice communication system that allows rapid, flexible access to a fiber optic transmission bus or medium and elimination of central switching.

Two physical configurations for fiber optic buses or transmission mediums have been proposed, rings with T taps at every user position, or a star configuration in which every user enters the system via a line and his signal is coupled to every other line via a star coupler. Either structure could be employed. Stars have less loss as the number of users increases, while T systems are usually easier to lay out. In either case, a common fiber optic channel having wide bandwidth, common access for all potential users and minimum ringing due to impedance mismatching is used in the present invention.

Another object of the present invention is to provide an integrated data and voice communication system employing a star coupler as the common fiber optic transmission medium and a micro-computer associated with each one of the users to enable any one of the plurality of data and voice users to establish communication with any other selected one of the plurality of data and voice users.

A feature of the present invention is the provision of an asynchronous integrated voice and data communication system comprising a plurality of data users; a plurality of voice users; a fiber optic transmission medium enabling each of the plurality of data and voice users to receive transmissions from all others of the plurality of data and voice users; a plurality of first means each coupled to a different one of the plurality of voice users to convert voice signals to coded signals and vice versa; a plurality of second means each coupled to the transmission medium, a different one of the plurality of first means and a different one of the plurality of data users to enable each of the plurality of data and voice users to have random access to the transmission medium; and a plurality of third means each coupled to a different one of the second means and an associated one of the plurality of data and voice users to enable any one of the plurality of data and voice users to establish communication with any other selected one of the plurality of data and voice users.

BRIEF DESCRIPTION OF THE DRAWING

Above-mentioned and other features and objects of this invention will become more apparent by reference to the following description taken in conjunction with the accompanying drawing, in which:

FIG. 2 is a block diagram illustrating the transmit and receive sections of the audio interface illustrating generally the encoder and decoder of FIG. 1;

FIG. 3 is a flow diagram illustrating the operation of the packetizer of FIG. 1;

FIG. 4 is a diagram of the data flow of the packetizer of FIG. 1;

FIG. 5 is a block diagram of the optical transmitter of FIG. 1;

FIG. 6 is a laser transfer function with current input waveform resulting in an optical output in the arrangement of FIG. 5;

FIG. 7 is a block diagram of the receiver data and timing recovering modem forming a portion of the optical receiver of FIG. 1;

DESCRIPTION OF THE PREFERRED EMBODIMENT

I. Overall System

With the rapidly dropping cost of memory and processing brought on by LSI and VLSI technology, the requirement to conserve buffer size and processing requirements is no longer overriding, and with optical fiber transmission, the requirement for efficient bandwidth use is radically altered. What is overriding in many applications is the cost of maintaining different communications systems for users that require both data and voice service. Therefore, to accommodate voice and data users, a different switching approach is presented herein. The approach to be employed here to provide this type of switching arrangement is to use optical fiber transmission as a broadband interconnect and to provide a microcomputer in a common switching arrangement which effectively is not a switch as known in conventional switching systems.

Figure 1:
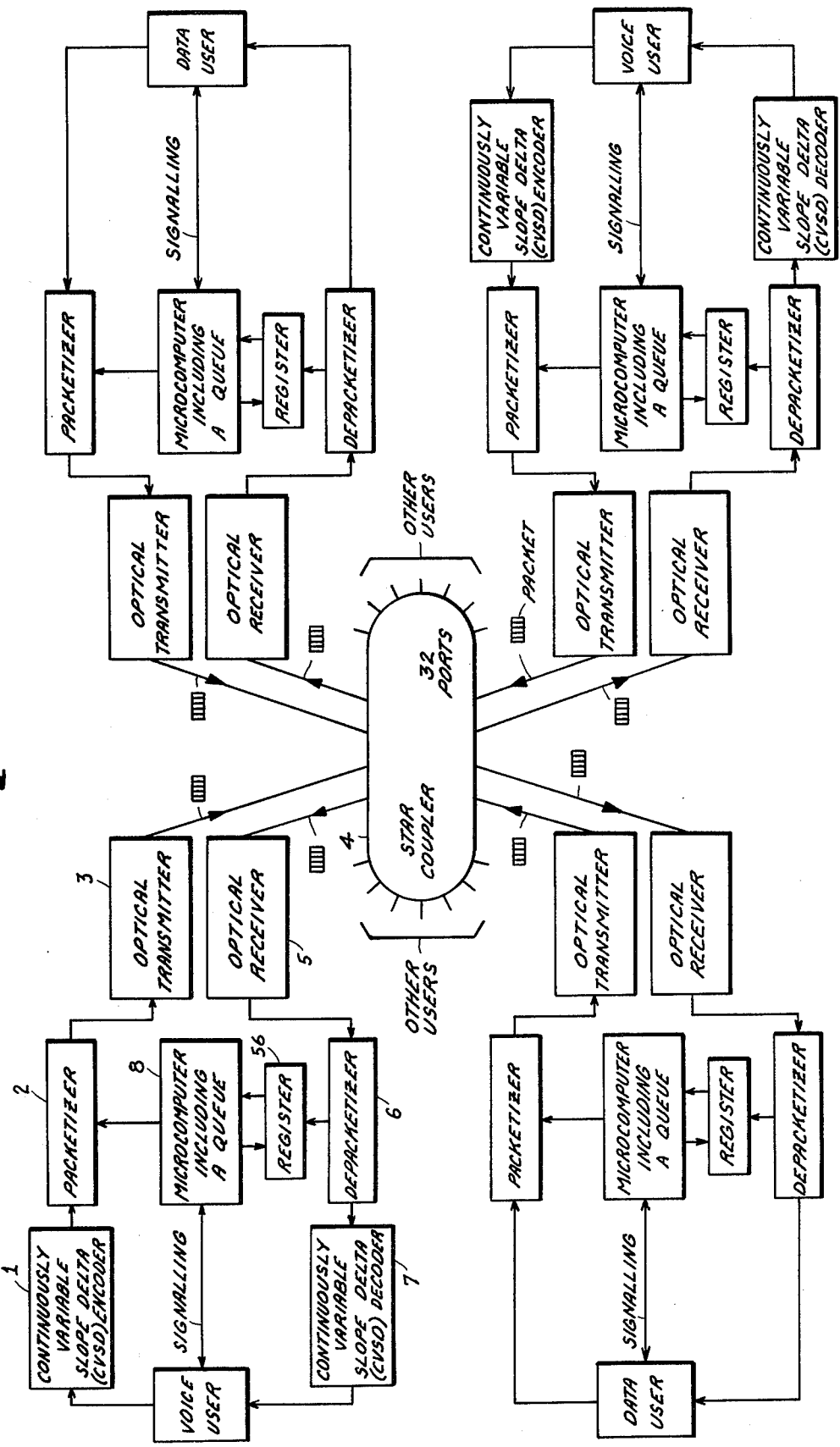
FIG. 1 is a block diagram illustrating the integrated data and voice communication system in accordance with the principles of the present invention.

Since this approach is based on using an optical fiber as a broadband interconnect, the information from each of the users will be handled in a packetized form and broadcast on the optical fiber transmission medium as shown in FIG. 1. As shown in FIG. 1, each voice user or terminal includes a continuously variable slope delta (CVSD) encoder 1, a packetizer 2, an optical transmitter 3 which transmits packets to the transmission medium, including the star coupler 4 which transmits the packet output to all other users. A packet from star coupler 4 is received by an optical receiver 5 whose output is coupled to a depacketizer 6, and hence to a CVSD decoder 7 and then to the voice user. The voice user terminal also includes a microcomputer 8 which provides the signalling required to establish communication between this particular user or terminal and any selected other one of the users or terminals connected to the optical transmission medium 4. Each of the data users includes the same equipment as the voice user other than the CVSD encoder and decoder since the output of the data user is already in a coded form and does not have to be converted to a coded form.

Operation proceeds in the following manner. All messages to be placed on the bus or transmission medium 4 are preceded by a header or preamble containing information on the type of traffic mode, i.e. broadcast to all stations, conference or party line, or user to user, followed by the address or addresses of the intended recipients followed by the address of the originator. After some optional spacing the message follows. Each transmission block or packet may be also encoded for error detection. This packet is stored in a buffer and sent over the data bus at a higher rate than it was generated at a time determined by the originator. This data packet can also be held for further reference at the transmitter. All users of the bus constantly scan the preamble portions of the transmissions on the bus for their address. If his address is found, he places the originator's signature in storage, reads the message and, if required, checks for errors. Errors can originate from noise or from two transmissions overlapping in time at the receiver. Such overlaps occur since all users generate transmissions at will (random). If no acknowledgment is received by the originator within an agreed-upon period of time, the originator repeats his message at some random time with respect to the previous message. This random selection in time of transmission after an error keeps two individuals who may be in near synchronism from interfering on successive transmissions. If all users employ a sufficiently high data rate in their transmissions, so that even when all users are active there are messages on the bus a small fraction of the time, then the probability of such "collisions" becomes very small and each user operates as if he had a free channel to the other users. No circuit switching is required between users, various demand structures are compatible and neither network control nor schemes of time synchronization between users need be employed. Bandwidth of the fiber optic cable has been effectively traded for simple inter-user interface electronics and flexible use.

Since any collision in time between messages is catastrophic, the most effective use of the transmission medium or bus is made if it is guaranteed that any two interfering transmissions (packets) will overlap almost completely. A simple distribution of frequency to all stations will serve to improve this. If any transmission begins only at the times of zero crossings of the frequency reference, for instance, then interfering transmissions will have a high degree of overlap and the channel will be used more effectively with only a minor increase in equipment complexity.

The communication system as illustrated in FIG. 1 employs a random block transmission (packet) communication format over a wide bandwidth medium such as an optical fiber to eliminate the need for inter-station timing and synchronization; to eliminate the need for time slot assignment; to provide broadcast mode and multi-user communication; to provide compatibility with voice and data communication; and to provide fairly efficient channel utilization on a demand basis.

The technique employed in the communication system of FIG. 1 assures a fully survivable routing and a maximum compatibility for both data and voice users by running the interconnect at a bandwidth greatly exceeding the sum of the users' bandwidths. Thus, minimum throughput delays can be obtained. Achievement of virtual real time between users and statistical multiplexing of users in the time domain are permitted by this procedure. Therefore, optical fiber bandwidth is employed to achieve high user-to-user throughput with a minimum delay and an accommodation of a maximum variety of user types.

Prior art systems have used controller oriented, dedicated bus types of architectures to handle data and voice communications and have specified fiber optics as a transmission medium, but have not employed a fully integrated communications system to handle all needs of both voice and multiple types of data users on a common medium. The communications system of the instant invention provides a single low-cost, highly reliable and survivable communication architecture for all the communication needs of all types of data and voice users.

The key issue in providing a single communication medium to enable an integrated communication system to handle all needs of both voice and multiple types of data users on a common medium is how to handle the voice. The approach of beginning with a switched voice network and overlaying data has been rejected on the basis of efficiency. The present communication system integrates voice into a packetized data communication system. This can be accomplished because voice is actually a rather "bursty" data source when viewed on a fine enough time scale. Circuit switches view voice traffic on a conversational basis, but if a single talker is analyzed, his traffic consists of half silence and his speaking periods alternate between silence and talk spurts of nominal 100 millisecond duration. If only the talk spurts are sent, then there are two favorable results: first the data rate is reduced to almost one-fourth, a fact long recognized in time assignment speech interpolation systems; and second, the voice source dynamics now looks like that of a data source. This source can then be handled over the medium as packetized data. The major impediment in this approach to integrated voice and data communications is the effect of the throughput delay on the voice users. Generally, throughput delay of more than 100-200 milliseconds is noticeable, and such a delay is not uncommon in a packet data network. Furthermore, this delay is variable from packet to packet. However, if the transmission channel is operating below capacity, there are protocol techniques, generally classified as random multiple access broadcast channels to make the delay acceptably low.

Such techniques require considerable amounts of bandwidth on a single channel. Optical fiber transmission provides a nearly ideal economic source of such bandwidth. Not only that, but it has major advantages in immunity to electromagnetic interference and bulk that makes it attractive purely on its physical merits. Hence, the optical fiber is a natural medium for the implementation of the integrated data and voice communication system of the present application. Furthermore, the use of broadcast random multiple access techniques allows the common network equipment to be completely passive, thus assuring a highly reliable system.

The communication system of FIG. 1 is a broadcast random-multiple-access system which provides an economic survivable, flexible and expandable system for combined voice-data multi-user communication system requiring the large bandwidth of a fiber optic transmission medium which is capable of economically supporting a broadcast channel of the required bandwidths. Since the system is intended for both voice and data communications, all parts of a terminal or user, except the user interface, are common. With the packet approach to data communications well established, the interface between voice users and the remainder of the terminal is encoded in the CVSD modulation format. This format has an additionally attractive feature of an easily identifiable idle code which permits sensing and suppressing data transmission during idle periods in the speech for an up to 4-fold reduction in voice data rate.

As indicated, the general class of network protocols employed in the system of the present application are termed broadcast random multiple access. Broadcast implies that there is no intelligent intermediary discriminating between users, but rather every user's transmission is fully visible to all other users. Thus, the common apparatus in the network can be purely resistive or, at the worst, very simple and redundant, resulting in a highly available and reliable communication system. Random-multiple access implies that network access procedures and rules of order are determined between the channel and each individual user rather than between a user and a controller or between any designated pair of users. Therefore, system coordination functions are eliminated and few algorithms must be executed by the terminal, permitting a low-cost interface and reduced cost per line.

As previously mentioned, the communication system of FIG. 1 operates with a star coupler 4. With this system all users interact at star coupler 4, so that any collisions will occur there and be heard identically by all users. The system operates in the following manner. A packet is forwarded from the user's subsystem to the packetizer for transmission and is launched onto the optical bus. The packet is received at all terminals, but only the addressed terminal processes the packet and hands it through to its user subsystem. Meanwhile, the transmitting terminal is listening for its own transmission to ensure that it was not interfered with. If it was interfered with by a second user attempting transmission, the presence of invalid Manchester data words in the received packet would indicate the interference, and the transmitter would reattempt transmission. The description that follows will address the basic algorithms rather than the intricacies of the TTL logic selected for the implementation thereof. The order of discussion will follow the progress from the transmitting user through the system to the receiving user. In this way all five of the following fundamental terminal subsystems will be described: audio interface, packetizer, optical transceiver, modem and depacketizer. The system of FIG. 1 is implemented using hardwired circuitry with a standard low-power Schottky (LS) TTL logic used for low-speed circuitry and standard Schottky (S) TTL used for high-speed circuitry. The only exception to this is the CMOS encoder/decoder on the audio interface board. Circuit speeds are such that the new generation of CMOS technologies will be suitable for almost all circuit functions.

II. Audio Interface

A data user does not have an interface problem with the packetizer 2 and the depacketizer 6 since there is no need of code conversion. Referring to FIG. 2, there is disclosed therein the user subsystem which is an audio interface intended to service the requirements of voice users. The audio interface of FIG. 2 provides the necessary conversions between the audio frequency analog and bit-parallel digital data required to interface the user subset and the remainder of the terminal. The basic analog-digital or digital-analog conversion is performed with CVSD modulation circuits because they offer the following features: (1) they are simple and low-cost and LSI codecs are available and (2) these circuits produce an easily detected and generated idle code.

FIG. 2 illustrates both the transmit and receive sections of the audio interface board implemented in a breadboard implementation. Both transmit and received sections share a common clock 9. The transmit section includes preamplifier and filters 10, a CVSD encoder 11, an idle suppressor and serial-parallel converter 12 and a first-in first-out shift register buffer 13. The receive section of the audio interface circuit includes a first-in first-out shift register buffer 14, an idle insertion and parallel-to-serial converter 15, a CVSD decoder 16 and an amplifier and filter 17.

A CVSD encoder 11 and decoder 16 are well known circuitry in the art and are available commercially. The idle suppressor detects the idle CVSD code 101 or 010 and inhibits the clock to the buffer 13. The idle inserter reinserts these codes at the receiver when buffer 14 is empty. The serial-to-parallel converter and parallel-toserial converters are also well known circuitry in the art as are buffers 13 and 14.

In the transmit section of the audio interface of FIG. 2, the analog signal from the handset microphone is amplified and filtered in circuit 10 prior to digital conversion by the CVSD encoder 11. Aside from level and impedance modifications, this analog circuitry limits the bandwidth to the standard 4-kHz telephonic bandwidth, thus avoiding frequency aliasing problems. The CVSD encoder 11 is a standard design which operates at either a 16- or 32-kbps rate. The CVSD encoder/decoder parameters (such as, step size, syllabic time constant and integration time constants) are consistent with standard systems. The digital bit-serial output of CVSD encoder 11 is converted into a 4-bit parallel word by a shift register in circuit 12.

To detect deviations from idle, the output of the shift register is examined. The present implementation of this circuitry permits the selection of one, two or three consecutive bits which deviate from the idle pattern to trigger the formation of a packet. Experiments demonstrate that use of three consecutive deviations as a trigger criterion results in approximately 70 percent less data being transmitted than would be if the idle code were not suppressed in a normal conversation in a moderate noise environment. The output from the shift register is also connected to the input of a 64-word First-In-First-Out buffer 13. Buffer 13 permits asynchronous data transfer to the packetizer section of the terminal as well as temporary storage for the data while the packetizer is receiving new data.

The receive section of the audio interface of FIG. 2 is the inverse of the transmit section. Data from the packetizer is asynchronously transferred to a first-in-first-out buffer 14 which also stores data so that the depacketizer memory can be used to process a new message. A shift register converts the 8-bit parallel words to the bit-serial format required by the CVSD decoder 16 as well as inserting an idle code when the buffer is empty. The output from the CVSD encoder 16 is filtered and amplified in circuit 17 and delivered to the handset earphone.

A very useful result of CVSD's with idle code suppression/reinsertion is the much greater tolerance to frequency differences between transmit and receive clocks than conventional systems. In the conventional systems, the transmit and receive clocks must be synchronized. If the clocks are not synchronized, they must not be different by more than one part in $10^6$ in order to maintain a bit-error rate of less than $10^{-6}$. This is usually considered to be a minimum for reasonable CVSD performance. In a system where periods of idle code are not transmitted but are generated artificially at the receiver, differences in clock rates result in errors in the number of bits of idle code which occur between active speech periods. These errors are not objectionable and permit differences of several percent.

III. Packetizer

The packetizer includes circuitry which prepares data for transmission on the transmission medium or bus. The formation of a packet from the user data source (the output of buffer 13 of FIG. 2 or the output of a data user) requires the following distinct types of operation to be performed. (1) Assembly of a block of data bits in memory, (2) transmittal of an assembled block after line coding and appending terminal addresses, (3) detection and resolution of conflicts between this and other terminals for control of the transmission medium. These operations are illustrated in FIG. 3.

In simple systems, the packetizer is required to perform only one of these three operations at a time which can then be considered modes of operation for the packetizer. These operations must be performed in a manner consistent with the protocol requirements. The circuitry accommodates the following: (1) pure contention or CSMA (Carrier Sense Multiple Access) protocol, (2) Manchester encoding of data, (3) unrestricted preamble encoding, and (4) variable size data packets.

The packetizer sequences through the assembly, transmit and wait modes of operation are illustrated in FIGS. 3 and 4. A majority of the time, the packetizer is in the assemble mode where it is accepting data from the user subsystem. As previously described, the user subsystem initiates the formation of the packet as well as the rate at which data is generated. Data is accepted as illustrated in FIG. 4 (A) through the serial-to-parallel converter such as shift register 18 until a predetermined number of words is received in the packetizer memory in the form of shift registers 19 and 20. The packetizer then goes into the transmit mode as illustrated in FIG. 4 (B) where the following manipulations are performed: (1) data from the user is temporarily not accepted (any data generated by the user is stored in buffer 13). (2) If CSMA is employed, the terminal waits until the bus is not occupied. (3) The preamble (32 bits) generated and stored in the terminal control circuitry 21 is parallel loaded into a shift register array 22. (4) Data words (4 bits) in the shift register 20 are encoded into 8-bit Manchester words by Manchester encoder 23 as well as being recycled into the front of the memory 20. (5) Manchester coded words at the output of encoder 23 are loaded into shift register array 22 behind the preamble. (6) The output of the shift register array 22 is parallel-to-serial converted in shift register 23' and the serial bit stream is delivered to the transmitter 3. (7) After all bits are shifted out of the output shift register 23', a new word is loaded from the shift register array 22.

This process continues until the entire packet, consisting of preamble and data, has been transmitted, at which time the packetizer 2 goes into its third mode, a wait mode. In the wait mode, data does not flow as shown in FIG. 4 (C). The packetizer waits for the depacketizer 6 to detect a clean copy of its own transmission. As illustrated in FIG. 3, there are two possible courses of action: (1) if a clean copy of this terminal's transmission is detected, the data stored in memory 20 is cleared (or dumped) and the packetizer 2 returns to the assembly mode; (2) a predetermined time interval passes without an indication from depacketizer 6 (because the received copy is "polluted" by a collision with another packet) and packetizer 2 returns to the transmit mode to retransmit the packet.

Manchester encoder 23 may be provided by an EXCLUSIVE-OR circuit wherein the encoded data in memory 20 is clocked by a clock operating at the data rate. Table I below shows the relationship between an NRZ (Non Return to Zero) encoded data and the Manchester encoder output.

TABLE I

| NZR Encoded Data | Manchester Encoded Data | |
| --- | --- | --- |
| 1 | 10 | |
| 0 | 01 | |
|  | 11 | Invalid |

TABLE I-continued

| NZR Encoded Data | Manchester Encoded Data |
|---|---|
| 00 | } Manchester Codes |

IV. Optical Transceiving

The interface between the terminal electronics and the fiber optic bus or transmission medium 4 is provided by an optical transmitter and receiver.

Of the two options for a transmitter device, light-emitting diode (LED) can fulfill the requirements of some low rate/power applications using standard circuitry, but the majority of military systems are large in size and traffic rates and will, therefore, require the higher performance of laser sources. In addition, the emission bandwidth requirements cannot be satisfied for wavelength multiplexed systems with an LED. A laser source easily fulfills these bandwidth requirements.

Two options are also available for a detector in the receiver; a PIN diode or an avalanche photodiode (APD). Although the APD has better sensitivity than a PIN, the circuitry around the two detectors is not substantially different (except the higher bias voltage required for the APD), so the PIN was selected for use in the reduction to practice of the present application. The laser and PIN diode were selected for the reduction to practice because they seem to represent an approach which would satisfy the requirements of most applications.

Referring to FIG. 5, there is illustrated therein the high speed laser drive circuit. This approach employs a non-saturating current steering circuit 24 similar to that reported by Shumate, P. W. Jr.; Chen, F. S.; and Dorman, P. W. "GaAlAs Laser Transmitter for Light-WAVE Transmission Systems," The Bell System Technical Journal; page 1823–1830, July–August 1978. This circuitry including the current steering circuit 24 and the constant current source 25 biases the laser 26 slightly lower than the threshold where the laser device transfer function is that of an LED as illustrated in FIG. 6. The digital input signal from packetizer 2 is regenerated and shifted in level shifter and regenerator 27 to be compatible with the current steering network 24 which directs the output of the constant current source 25 to either the laser diode 26 or a load resistor 28. A portion of the light in the output fiber 29 is detected in optical detector 30 and compared with the input waveform in the bias current control circuit 31, the output of which is used to control the constant current source 32. This technique offers the following advantages over other techniques: (1) non-saturating logic is capable of much higher switching speeds and lower propagation delay than saturated logic, (2) optical stabilization compensates for laser variation due to temperature and aging effects by comparing the input and output information rather than comparing the average output and some desired average, (3) the extinction ratio (on-to-off ratio of light pulses) can be easily controlled to avoid excessive sensitivity penalty at the receiver, (4) the biased laser has superior turn-on characteristics to unbiased laser because the small current change does not appreciably change the laser voltage, thereby reducing diode capacitance and dynamic thermal effects, and (5) a low frequency, closed-loop system stabilizes the light output by varying a DC bias current source.

V. Modem

The approach of the receiver circuitry is innovative, since it employs a tuned load to reduce the effects of optical detector reactance and has produced a 6 dB (decibel) SRN (signal to noise ratio) improvement over high impedance approaches.

The signal from the electro-optical receiver must be interfaced with the remainder of the terminal electronics. The modem accomplishes the functions of data and timing recovery from an incoming optical burst.

The data communications problem with which the receiver modem in a data bus system must deal has three primary characteristics: (1) the data encoded is unipolar since this is an energy communication system, (2) transmissions are of an asynchronous-burst nature with a teletype-start type synchronization preamble, and (3) information is transferred on a transactional basis, thus, all overhead activities and inter-message gaps which reduce efficiency must be minimized.

Each of these possess signal processing problems that must be solved.

The unipolar-burst nature of the optical signal possesses an indeterminancy in the proper slicing level for regeneration. A bipolar signal can always be sliced at zero level, independent of its amplitude. However, the unipolar bursts have a pedestal present which represents the proper slicing level for the signal, and this pedestal varies with the amplitude of the signal. The pedestal also changes shape depending on the frequency response of the optical receiver. To track this pedestal, a clamp circuit which uses the maximum and minimum values of the waveform is employed. As illustrated in FIG. 7, a signal emerging from the optical receiver passes through an amplifier 33 where it then branches to both delayed line circuit 34 and a dynamic clamp circuit 35. A 50 nanosecond delay permits the clamp time to establish a reference level for the comparator. The receive reference level is extracted by means of a doubly balanced clamp circuit 36. Circuit 36 employs two hot-carrier diodes to charge capacitors on the peak and valley of the waveform. A resistive voltage divider automatically adjusts to the midpoint of the waveform.

When the end of a transmission is detected, the pedestal must be reset to zero by using two monostable multi-vibrators to detect the absence of a pulse for more than 120 nanoseconds. When this condition occurs, a reset pulse is assured, causing two field effect devices to discharge the capacitors. Therefore, the clamp extracts the pedestal and eliminates any retransmission delay due to pedestal delay.

When the output of clamp circuit 36 is applied as a reference level to the comparator, in the form of the flip-flop 37 and the EXCLUSIVE-OR circuit 38, amplitude regeneration occurs.

This approach is preferred for the following reasons: (1) permits use of an AC coupled amplifier; (2) maximizes receiver sensitivity; (3) accommodates optical dynamic ranges greater than 30 dB; (4) incurs no more than 120 nanosecond retransmission delay.

A rapid synchronization is required to deal with burst transmissions and such synchronization is accomplished as illustrated in FIG. 7 by means of a low-Q timing circuit 39. The high-transition density of a Manchester data code allows a low-Q timing circuit 39 to hold excellent accuracy. An excitation circuit, such as edge detector 40, that effectively lowers the Q of the tank further allows excitation with one pulse. The cumulative phase error of this circuit is 4°. A double balanced clamp circuit 41 at the output of circuit 39 provides the necessary clock for the regeneration of the data in flip-flop 37 and EXCLUSIVE-OR circuit 38 and the bit clock is derived at the output of circuit 41 by a divide-by-two circuit 42.

VI. Depacketizer

Each of the depacketizers 6 primarily provides an interface between the receive modem of FIG. 7 and the receive section of the user subsystem of FIG. 2. A secondary function involves the validation and initiation of transmitted messages as part of the contention resolution function of the packetizers' operations. The depacketizer circuitry evaluates the relevance of the received signals to this terminal and then initiates the terminal's reaction. To form this evaluation, depacketizer 6 must perform the following operations: (1) synchronization of packet elements with the signal processing circuitry, (2) recognition of addresses identifying the terminal's incoming and outgoing messages, (3) storage of data contained in incoming messages, and (4) validation of relevant packets.

After these evaluations are performed, depacketizer 6 will respond by passing stored data from an incoming message to the user or indicating to the packetizer 2 that a successful transmission was performed. All irrelevant or invalid received signals will not produce an output from depacketizer 6 and will be ignored by the rest of the terminal.

Figure 8:
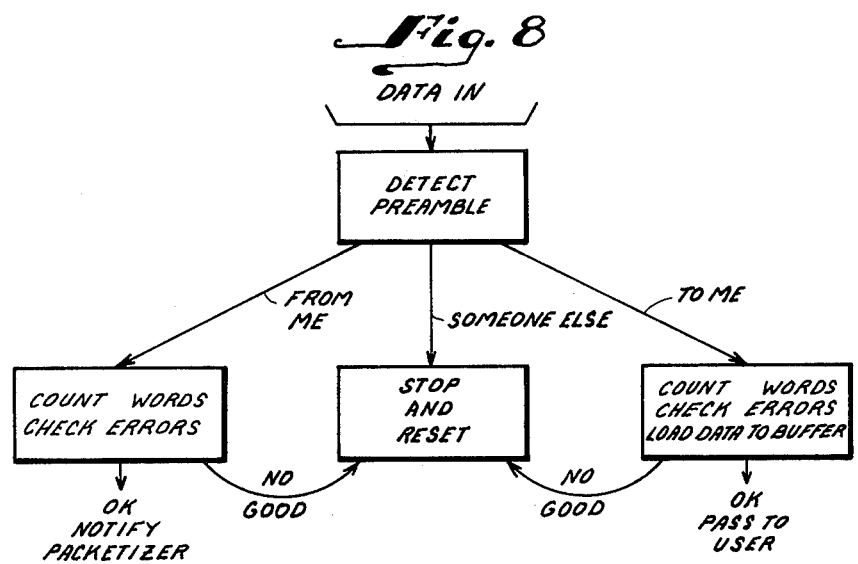
FIG. 8 is a flow diagram of the operation of the depacketizer of FIG. 1.
Figure 9:
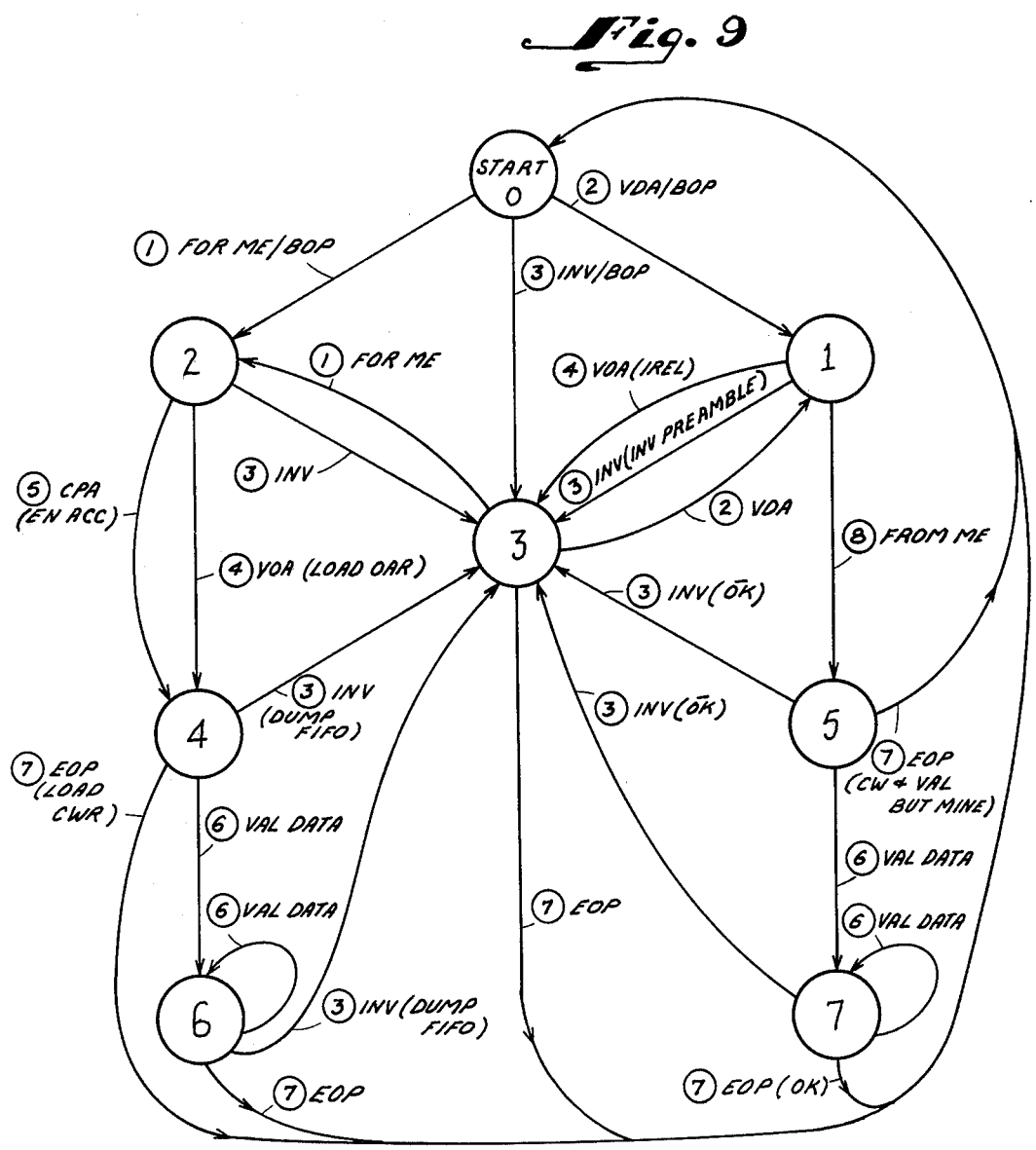
FIG. 9 is a state diagram of the depacketizer of FIG. 1
Figure 10:
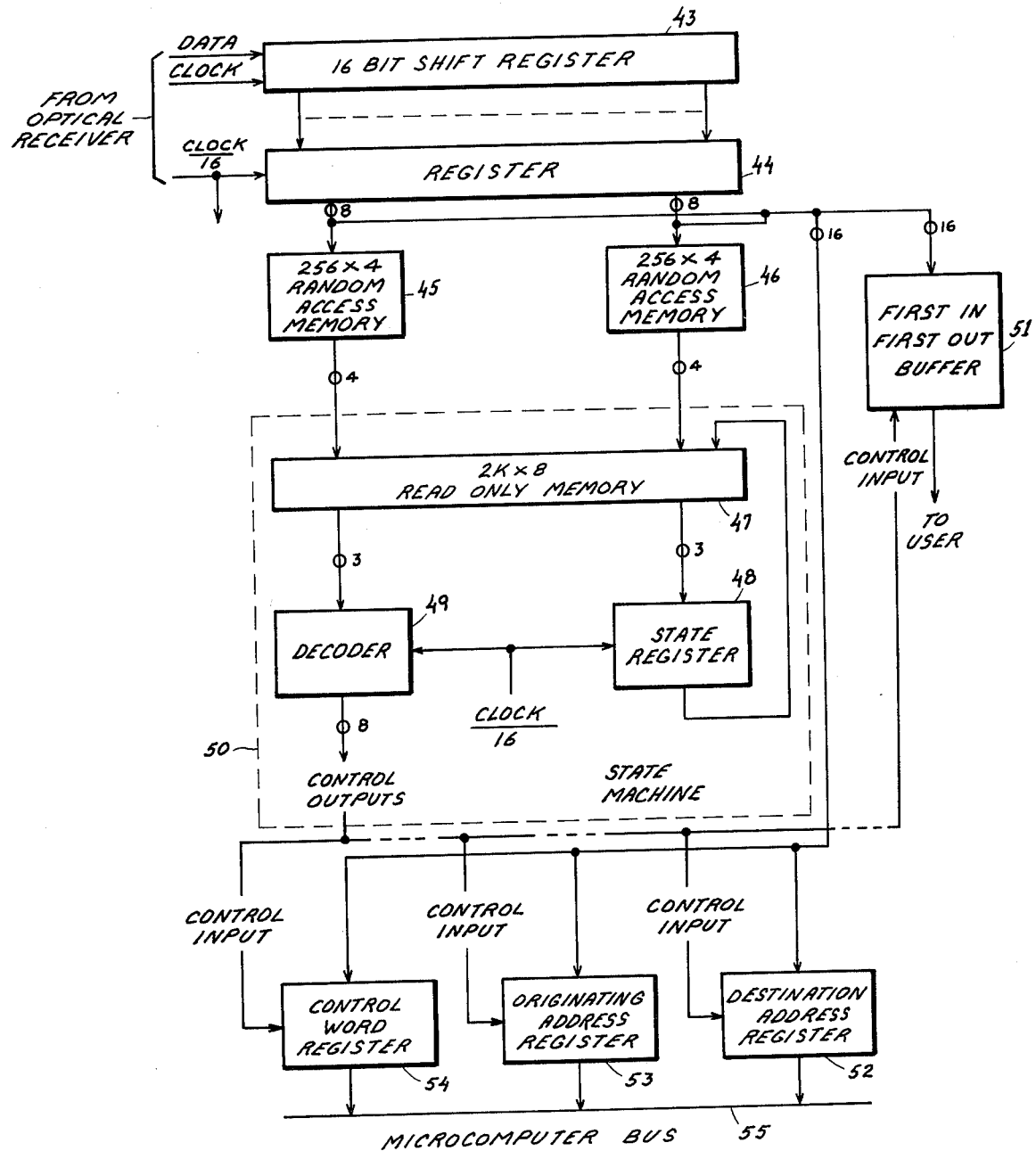
FIG. 10 is a block diagram of one embodiment of the depacketizer of FIG. 1.

The operation of depacketizer 6 is illustrated in the flow diagram of FIG. 8. FIG. 9 is the state diagram of one possible embodiment of the depacketizer 6 as shown in FIG. 10. When a packet is received, depacketizer 6 must detect the beginning of the packet (the preamble) and the destination and origination addresses. These determinations can be performed very conveniently after received information is examined as groups of bits (words). The bit serial information input is, therefore, converted into words by using a shift register, such as the 16-bit shift register 43 of FIG. 10. The beginning of the preamble is determined by examining shift register 43 after every clock pulse for the presence of the first bit of the preamble. Once the beginning of the preamble is determined, the location of the addresses and data is defined. Register 44 can now store the words as they appear in register 43. The outputs of register 44 are the addresses of the random access memories 45 and 46, whose outputs are addresses of the read only memory 47. Memories 45 and 46 perform a code compression. Three of the outputs from memory 47 are coupled to a state register 48, whose output is returned to memory 47. Three others of the outputs of memory 47 are coupled to a decoder 49 to produce eight control outputs which are defined in Table II hereinbelow. The circled numbers in Table II below appear also in the state diagram of FIG. 9 and, thereby, Table II represents a definition of the mnemonics employed in the state diagram of FIG. 9 with other mnemonics employed in FIG. 9 being defined in Table III.

TABLE II

| | | |
|---|---|---|
| ① | FOR ME | Local Destination Address and Sync. |
| ② | VDA | Valid Destination Address and Sync. |
| ③ | INV | Invalid Data |
| ④ | VOA | Valid Origination Address and Sync. |
| ⑤ | CPA | Connected Party Origination Address and Sync. |
| ⑥ | VAL DATA | Valid Data |

TABLE II-continued

| | | |
|---|---|---|
| ⑦ | EOP | End of Packet |
| ⑧ | FROM ME | Local Origination Address and Sync. |

TABLE III

| | |
|---|---|
| BOP | Beginning of Packet |
| EN ACC | Enable Acceptance |
| FIFO | First-In-First-Out |
| IREL | Irrelevant |
| OAR | Originating Address Register |
| CWR | Control Word Register |
| INV PRE | Invalid Preamble |
| OK | All Right |
| $\overline{OK}$ | Not All Right |

Referring to FIG. 10, read only memory 47, register 48 and decoder 49 compose a state machine 50 which enables carrying out the desired operation of the depacketizer 6. The 16 outputs from register 44 are coupled to the first-in and first-out buffer 51 and also are coupled to the destination address register 52, the originating address register 53 and the control word register 54, which are loaded under control of control outputs of decoder 49 and whose outputs are coupled to microcomputer bus 55 which is coupled to microcomputer 8 to assist in carrying out signalling so that any terminal on the optical transmission medium can establish a "connection" to any other terminal.

The state diagram of FIG. 9 clearly illustrates the operation of the depacketizer of FIG. 10 for delivering the packet to the user from buffer 51 and also for establishing the "connection" referred to hereinabove which will be described in greater detail hereinbelow with reference to FIG. 11.

If the preamble contains the terminal's address as a destination address, the subsequent data is stored and, if valid, passed to the user from buffer 51. If the preamble contains the terminal's address as an origination address, the subsequent data is checked for validity and, if valid, an indication is presented to packetizer 2 to enable dumping of its first-in first-out buffer and transmitting a further packet.

Before a packet is validated, a packet must contain the proper amount of Manchester encoded bits. If an invalid Manchester encoded word is located, the state machine 50 will stop the depacketizer from accepting the remainder of the packet. The state machine 50 must indicate the number of received words to validate the packet. If any invalid code is found or the terminal address is not located in the preamble, the state machine 50 will stop and reset the packetizer 6.

VII. Signaling Control

The signal control system which includes microcomputer 8, interfaced with packetizer 2 and depacketizer 6 is employed to implement signaling so that any terminal on the bus or optical transmission medium can establish a "connection" to any other terminal. In the case of voice user terminals, the microcomputer 8 allows these terminals to emulate the functions of a circuit switch. The basic functions implemented are: (1) ring; (2) ring back; (3) busy; (4) release; and (5) answer.

Since there is nothing in the communication system of the present invention equivalent to the circuit switches of a central office to detect events and generate signaling, the terminals themselves must assume these functions and thus become sort of a distributed circuit switch. This signaling in the distributed system takes the form of control words which are exchanged between terminals to "set up a call." A state diagram for call set ups for both calling and called parties is shown in FIG. 11. There has been no attempt to make this a comprehensive signaling plan which will accommodate various existing networks, but rather the intent here is to prove the basic signaling functions to place calls to any other subscriber and to provide representative loading on the transmission medium or bus.

The control words used to exchange signaling information have a preamble identical to data packets, but are only an additional 16 Manchester-encoded bits in length. Depacketizer 6 determines whether an incoming packet is a control word or a data packet on the basis of the length of the packet and deposits the control words in a register 56 (FIG. 1) which microcomputer 8 can read. Register 56 may be a separate register or may be incorporated in microcomputer 8. Microcomputer 8 then responds based on the current signaling state and the control word. Control words to be transmitted are accumulated in a queue contained in microprocessor 8. All words in the queue are transmitted every 200 milliseconds providing there are no data packets to be sent. The reason for the repetition is because of the way a control word which closely follows another is handled. If a control word arrives while the microcomputer 8 is processing another control word then the second one is ignored. Thus, the repetition is a simple way to compensate for "lost" control words.

Figure 11:
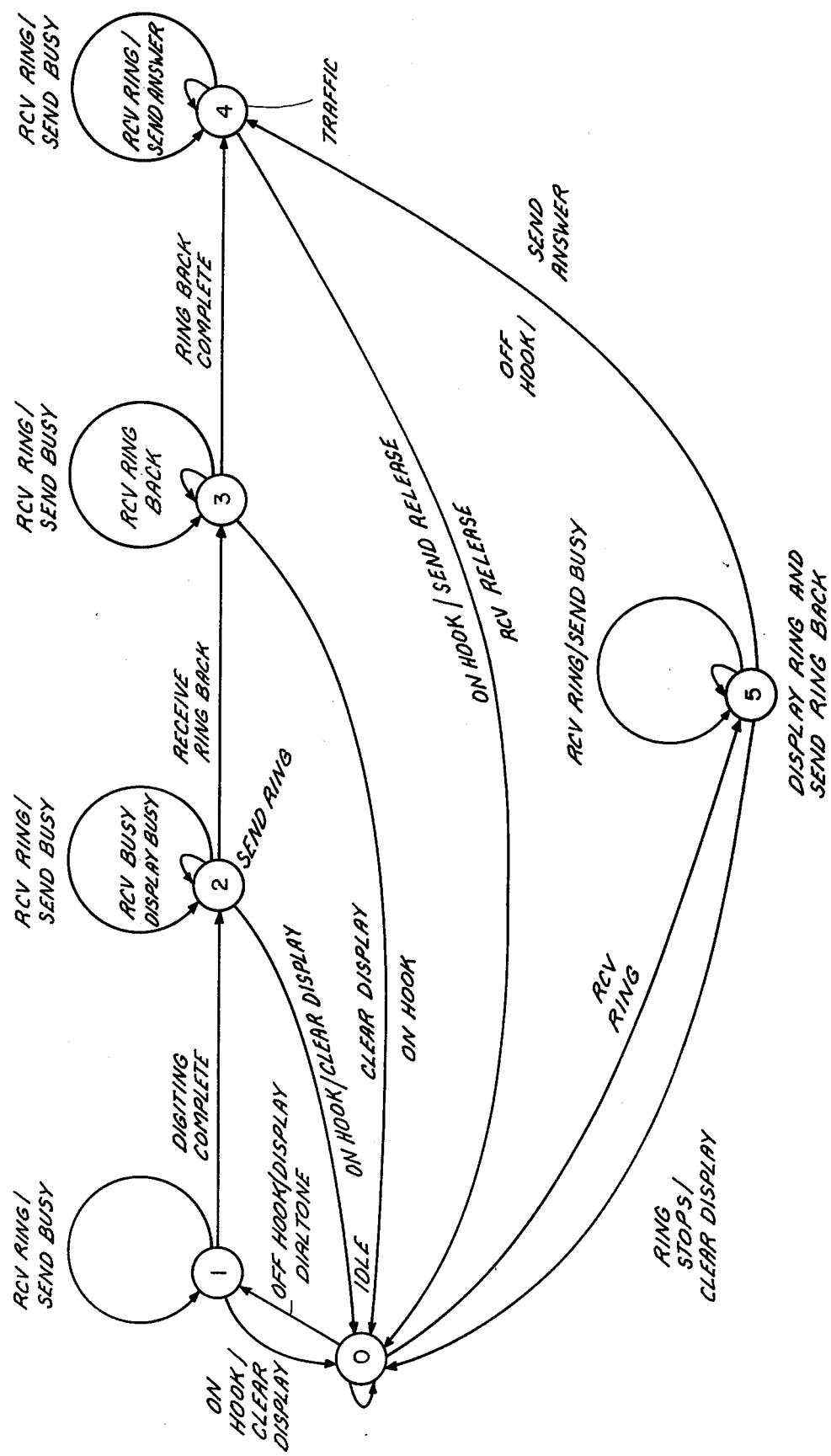
FIG. 11 is a state diagram of the call processing utilizing the microcomputers of FIG. 1.

The state diagram of FIG. 11 covers the signaling sequence for both calling and called parties. The discussion will cover each in turn. For both parties, the terminal starts in state 0. When the calling party goes off hook, the state is advanced to state 1 and dial tone is indicated to the user. After the user dials the number (three digits for a bus which supports 128 terminals), the state is advanced to state 2 and a ring control word is generated. The ring control word is sent until a ringback word is received from the called terminal at which point the state is advanced to state 3. The two terminals will continue to exchange ring control words and ringback control words until either the called party goes off-hook or the calling party goes on-hook. In the former case, the state is advanced to state 4, the called terminal stops sending ring-back control words, sends an answer control word and writes the calling terminal address to depacketizer 6 to enable it to process data packets coming from the calling terminal. In the latter case, the state is returned to state 0 and all control words cease. At the completion of a call, the called party goes on-hook; resets the state to state 0 and sends a release control word.

The signaling for the called party starts in state 0 and advances to state 5 upon receipt of a ring control word. The called terminal will respond to each ring control word with a ring-back control word and will indicate the presence of an incoming call to the user. When the user goes off-hook, the state is set to state 4, the ringback control words are changed to answer control words, and the calling terminal's address is written to the depacketizer 6 to enable it to accept data packets from the calling terminal. At completion of the call, the user goes on-hook, the state is reset to state 0, and a release control word is sent.

If during the progression of a call between two terminals another terminal tries to call one of the two involved in the call, a busy control word will be sent.

The use of microcomputer 8 to implement a signaling plan allows for relatively easy expansion in the number of states and the number of control words. Eventually, a signaling plan of much greater complexity emulating an existing network can be implemented with virtually no change in the hardware.

While we have described above the principles of our invention in connection with specific apparatus, it is to be clearly understood that this description is made only by way of example and not as a limitation to the scope of our invention as set forth in the objects thereof and in the accompanying claims.

We claim:

1. An asynchronous integrated voice and data communication system comprising:
   a plurality of data users;
   a plurality of voice users;
   a fiber optic transmission medium enabling each of said plurality of data and voice users to receive packet type transmissions from all others of said plurality of data and voice users at any completely random time;
   a plurality of first means each coupled to a different one of said plurality of voice users to convert voice signals to coded signals and vice versa;
   a plurality of second means each coupled to said transmission medium, certain ones of said plurality of second means each being coupled to certain ones of said plurality of second means each being coupled to a different one of said plurality of first means and other ones of said plurality of second means each being coupled to a different one of said plurality of data users to enable each of said plurality of data and voice users to have completely random pocket type access to said transmission medium at any time; and
   a plurality of third means each coupled to a different one of said second means and an associated one of said plurality of data and voice users to enable any one of said plurality of data and voice users to establish communication with any other selected one of said plurality of data and voice users at any completely random time.

2. A system according to claim 1, wherein
said transmission medium includes a star coupler coupled to each of said second means.

3. A system according to claim 2, wherein
each of said plurality of first means includes
   a continuously variable slope delta encoder coupled to an associated one of said plurality of voice users to convert voice signals to delta coded signals, and
   a continuously variable slope delta decoder coupled to said associated one of said plurality of voice users to convert received delta coded signals addressed to said associated one of said plurality of voice users to voice signals.

4. A system according to claim 3, wherein
each of said plurality of second means includes
   a packetizer coupled to said transmission medium and an associated one of said plurality of data users and said delta encoders to assemble input signals thereto into sequential first packets each having a predetermined length, to transmit each of said first packets in a random manner to said transmission medium and to wait until each of said first packets are returned from said transmission medium before transmitting a succeeding one of said first packets to said transmission medium, and a depacketizer coupled to said transmission medium and an associated one of said plurality of data users and said delta decoders to identify and check each of said returned first packets for errors, to inform said packetizer when each of said returned first packets are acceptable to enable said packetizers to assemble and transmit said succeeding one of said first packets, to identify received second packets having said predetermined length addressed to said associated one of said plurality of data and voice users from another of said plurality of data and voice users and to pass said received second packets to said associated one of said plurality of data users and said delta decoders, said packetizer responding to said depacketizer detecting unacceptable ones of said first packets to retransmit said unacceptable one of said first data packets to said transmission medium.

5. A system according to claim 4, wherein
said first and second packets are Manchester encoded for ease of error detection and ease of identifying idle periods at least in said voice signals, said idle periods being suppressed for transmission and later inserted after reception.

6. A system according to claim 4, wherein
each of said first and second packets includes
a first preamble portion having therein an origination address and a destination address to which said depacketizer responds, and
a first information portion following said first preamble portion.

7. A system according to claim 6, wherein
at least said first information portion is Manchester encoded for ease of error detection and ease of identifying idle periods at least in said voice signals, said idle periods being suppressed for transmission and later inserted after reception.

8. A system according to claim 6, wherein
said first preamble portion is generated separate from said first information portion, said first information portion being inserted after said first preamble portion in a shift register.

9. A system according to claim 8, wherein
at least said first information portion is Manchester encoded for ease of error detection.

10. A system according to claims 4, 6 or 8, wherein
said packetizer assembles said input signals in parallel form and transmits said first packets to said transmission medium in serial form, and
said depacketizer operates on said first and second packets in parallel form and provides an output signal therefrom in serial form.

11. A system according to claim 10, wherein
each of said third means includes a microcomputer coupled to said packetizer, said depacketizer and an associated one of said plurality of data and voice users.

12. A system according to claim 11, wherein
each of said microcomputers includes a microprocessor to provide signaling information in the form of first digital control words for coupling to said packetizer and to receive signal information in the form of second digital control words from said depacketizer to establish communication between an associated one of said plurality of data and voice users and any other selected one of said plurality of data and voice users.

13. A system according to claim 12, wherein
said first and second code words are Manchester encoded for ease of error detection.

14. A system according to claim 12, wherein
said first and second digital control words include a second preamble portion identical to said first preamble portion and a second information portion having a length less than the length of said first information portion.

15. A system according to claim 14, wherein
said first control words are retransmitted by said packetizer at predetermined time intervals provided no first packets are to be sent.

16. A system according to claim 15, wherein
said depacketizer includes fourth means to distinguish between said first and second packets and said second code words based on the length thereof.

17. A system according to claim 16, wherein
said second information portion is Manchester encoded for ease of error detection.

18. A system according to claim 15, wherein
said second information portion is Manchester encoded for ease of error detection.

19. A system according to claim 14, wherein
said second information portion is Manchester encoded for ease of error detection.

20. A system according to claim 4, further including
a plurality of optical transmitters each coupled between a different one of said packetizers and said transmission medium; and
a plurality of optical receivers each coupled between a different one of said depacketizers and said transmission medium.

21. A system according to claim 20, wherein
each of said plurality of optical transmitters includes a light-emitting diode.

22. A system according to claim 20, wherein
each of said plurality of optical transmitters includes a laser source.

23. A system according to claim 22, wherein
each of said laser sources includes a laser and a low-frequency, closed loop system to stabilize the light output from said laser by varying a direct current bias current coupled to bias said laser.

24. A system according to claims 20, 21, 22 or 23, wherein
each of said plurality of optical receivers include a PIN diode.

25. A system according to claims 20, 21, 22 or 23, wherein
each of said plurality of optical receivers includes an avalanche photodiode.

26. A system according to claims 1 or 2, wherein
each of said plurality of second means includes
a packetizer coupled to said transmission medium and an associated one of said plurality of data users and encoders to assemble input signals thereto into sequential first packets each having a predetermined length, to transmit each of said first packets in a random manner to said transmission medium and to wait until each of said first packets are returned from said transmission medium before transmitting a succeeding one of said first packets to said transmission medium, and a depacketizer coupled to said transmission medium and an associated one of said plurality of data users and decoders to identify and check each of said return first packets for errors, to inform said packetizer when each of said return first packets are acceptable to enable said packetizers to assemble and transmit said succeeding one of said first packets, to identify received second packets having said predetermined length addressed to said associated one of said plurality of data and voice users from another of said plurality of data and voice users and to pass said received second packets to said associated one of said plurality of data users and said decoders, said packetizer responding to said depacketizer detecting unacceptable ones of said first packets to retransmit said unacceptable one of said first packets to said transmission medium.

27. A system according to claim 1, wherein each of said plurality of first means includes a continuously variable slope delta encoder coupled to an associated one of said plurality of voice users to convert voice signals to delta coded signals, and a continuously variable slope delta decoder coupled to said associated one of said plurality of voice users to convert received delta coded signals addressed to said associated one of said plurality of voice users to voice signals.

28. A system according to claim 1, further including a plurality of optical transmitters each coupled between a different one of said plurality of second means and said transmission medium; and a plurality of optical receivers each coupled between a different one of said plurality of second means and said transmission medium.

29. A system according to claim 28, wherein each of said plurality of optical transmitters includes a light-emitting diode.

30. A system according to claim 28, wherein each of said plurality of optical transmitters includes a laser source.

31. A system according to claim 30, wherein each of said laser sources includes a laser and a low-frequency, closed loop system to stabilize the light output from said laser by varying a direct current bias current coupled to bias said laser.

32. A system according to claims 28, 29, 30 or 31, wherein each of said plurality of optical receivers include a PIN diode.

33. A system according to claims 28, 29, 30 or 31, wherein each of said plurality of optical receivers includes an avalanche photodiode.

* * * * *